US009058031B2

(12) United States Patent
Shah

(10) Patent No.: US 9,058,031 B2
(45) Date of Patent: Jun. 16, 2015

(54) DISPLAY MODULE FOR TOOLLESS COUPLING WITH PROGRAMMABLE CONTROLLER

(75) Inventor: Rajesh Ramesh Shah, Singapore (SG)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 499 days.

(21) Appl. No.: 13/281,225

(22) Filed: Oct. 25, 2011

(65) Prior Publication Data

US 2012/0109343 A1    May 3, 2012

(51) Int. Cl.
*G05B 19/409* (2006.01)

(52) U.S. Cl.
CPC .... *G05B 19/409* (2013.01); *G05B 2219/36159* (2013.01)

(58) Field of Classification Search
None
See application file for complete search history.

(56) References Cited

U.S. PATENT DOCUMENTS

| 4,143,417 | A | * | 3/1979 | Wald et al. ................. 360/55 |
| 4,870,531 | A | * | 9/1989 | Danek ....................... 361/93.1 |
| 4,945,443 | A | * | 7/1990 | DeBiasi et al. ............. 361/93.1 |
| 5,245,511 | A | * | 9/1993 | Watanabe .................... 361/814 |
| 5,303,113 | A | * | 4/1994 | Goleman et al. ........... 361/93.2 |
| 5,488,338 | A | * | 1/1996 | Seymour et al. ............ 335/202 |
| 6,406,328 | B1 | * | 6/2002 | Attarian et al. ............. 439/502 |
| 6,590,547 | B2 | * | 7/2003 | Moriconi et al. ............ 345/30 |
| 7,301,742 | B2 | * | 11/2007 | Tignor et al. ............... 361/93.3 |
| 7,974,064 | B2 | * | 7/2011 | Shah et al. .................. 361/170 |
| 8,325,485 | B2 | * | 12/2012 | Haugen et al. .............. 361/728 |
| 2004/0252421 | A1 | * | 12/2004 | Knox et al. ................... 361/23 |
| 2005/0251270 | A1 | * | 11/2005 | Barreau et al. .................. 700/17 |
| 2007/0019387 | A1 | * | 1/2007 | Schipper et al. ............. 361/725 |
| 2008/0129553 | A1 | * | 6/2008 | Rotzler et al. .................. 341/22 |

FOREIGN PATENT DOCUMENTS

| CN | 1259783 | A | 7/2000 |
| CN | 2427840 | Y | 4/2001 |
| CN | 1581113 | A | 2/2005 |
| CN | 1898534 | A | 1/2007 |
| CN | 101210828 | A | 7/2008 |
| CN | 201199321 | Y | 2/2009 |
| CN | 201440764 | U | 4/2010 |
| WO | WO 2010026013 | A1 * | 3/2010 |

OTHER PUBLICATIONS

Chinese Office Action issued Jan. 24, 2014.

* cited by examiner

*Primary Examiner* — Darrin Dunn
*Assistant Examiner* — Christopher E Everett
(74) *Attorney, Agent, or Firm* — Fletcher Yoder, P.C.

(57) ABSTRACT

An automation controller that includes a central processing unit configured to communicate via an input/output module with automation devices of a process controlled by the automation controller. The automation controller also includes a retention feature configured to toollessly couple with a detachable display and memory module. Further, the automation controller includes a controller connector configured to communicatively couple with a display connector of the detachable display and memory module such that the automation controller and the detachable display and memory module are communicatively coupled, wherein the central processing unit is configured to transmit data for presentation on a display of the detachable display and memory module and configured to receive data from a memory and/or a data entry feature of the detachable display and memory module when the detachable display and memory module is communicatively coupled to the automation controller.

20 Claims, 4 Drawing Sheets ated with the inability to access and/or program the controllers in the field. Indeed, in most traditional systems, a computer is required to access such systems in order to provide updates and so forth. It is now recognized that it may be desirable to eliminate this requirement along with the associated inefficiencies and expenses.

DISPLAY MODULE FOR TOOLLESS COUPLING WITH PROGRAMMABLE CONTROLLER

CROSS REFERENCE TO RELATED APPLICATIONS

This application claims priority from and the benefit of Singapore Application No. 201007961-4, filed on Oct. 28, 2010 entitled "Display Module for Toolless Coupling with Programmable Controller", which is herein incorporated by reference.

BACKGROUND

The invention relates generally to industrial automation and control systems, such as those used in industrial and commercial settings. More particularly, embodiments of the present invention relate to techniques for providing an attachable display module for industrial automation devices and programmable controllers of such systems.

Industrial automation and control systems are known and are in use for controlling factory automation and the like. Such systems typically include various components that cooperate to monitor and control a process and/or system (e.g., a manufacturing process or a machine). A programmable controller or automation controller is typically a central feature of a control system. For example, a typical control system includes one or more programmable logic controllers that coordinate with sensors, semiconductor power electronic circuits, power supplies, motor starters, relays, and so forth to control features and actions throughout an associated system or process. In operation, a typical programmable logic controller examines a series of inputs reflecting the status of a controlled process and changes outputs affecting control of the process. For example, a programmable logic controller may receive an analog signal from a sensor and adjust an output to an actuator depending on a value of the signal and associated logic programmed in a memory of the programmable controller.

In many applications, one or more programmable controllers are utilized to control different aspects of a process or system. For example, a large process may be divided into multiple different process sections each of which may be controlled by a separate programmable controller. As another example, numerous different traffic lights within a system of traffic lights may each be controlled by a separate programmable controller. Due to the large number of programmable controllers utilized in such applications, it may be desirable to limit the costs associated with such controllers by eliminating certain features of each programmable controller. For example, programmable controllers without a display are often utilized in such situations. This improves efficiency, especially when simple and low costs programmable controllers are being utilized, because including a display is often expensive relative to the overall costs of a programmable controller. However, this traditionally results in inefficiencies associated with the inability to access and/or program the controllers in the field. Indeed, in most traditional systems, a computer is required to access such systems in order to provide updates and so forth. It is now recognized that it may be desirable to eliminate this requirement along with the associated inefficiencies and expenses.

BRIEF DESCRIPTION

According to one embodiment of the present invention, an automation controller is provided. The automation controller includes a central processing unit configured to communicate via an input/output module with automation devices of a process controlled by the automation controller. Additionally, the automation controller includes a retention feature configured to toollessly couple with a detachable display and memory module. Further, the automation controller includes a controller connector configured to communicatively couple with a display connector of the detachable display and memory module such that the automation controller and the detachable display and memory module are communicatively coupled, wherein the central processing unit is configured to transmit data for presentation on a display of the detachable display and memory module and configured to receive data from a memory and/or a data entry feature of the detachable display and memory module when the detachable display and memory module is communicatively coupled to the automation controller.

According to one embodiment of the present invention, an automation controller system is provided. The system includes a detachable display and memory module with a module housing, a display disposed within the module housing, a memory disposed within the module housing, a first connector, and coupling features. The system also includes an automation controller. The automation controller includes a central processing unit configured to communicate via an input/output module with automation devices of a process controlled by the automation controller. Additionally, the automation controller includes a retention feature configured to toollessly couple with the coupling features of the detachable display and memory module. Further, the automation controller includes a second connector configured to communicatively couple with the first connector of the detachable display and memory module such that the automation controller and the detachable display and memory module are communicatively coupled, wherein the central processing unit is configured to transmit data for presentation on the display of the detachable display and memory module and configured to receive data from the memory of the detachable display and memory module when the detachable display and memory module is communicatively coupled to the automation controller.

According to one embodiment of the present invention, a detachable display and memory module is provided. The detachable display and memory module includes a module housing, a display disposed within the module housing, and a memory disposed within the module housing. Additionally, the detachable display and memory module includes a display connector configured to communicatively couple with a controller connector of an automation controller upon attachment of the detachable display and memory module with the automation controller. Further, the detachable display and memory module includes coupling features configured to toollessly couple with aspects of a retention feature of the automation controller.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
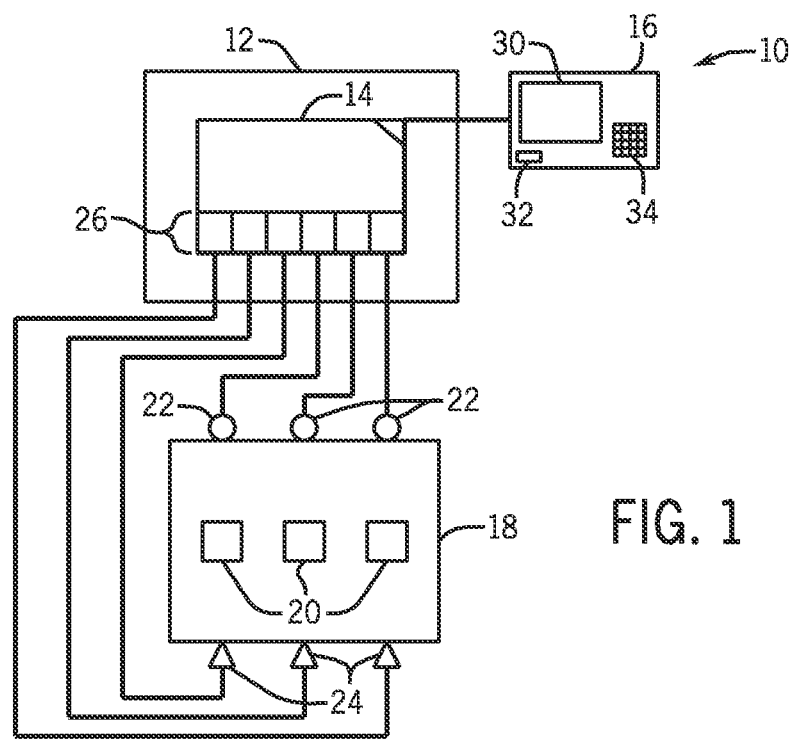
FIG. 1 is a schematic view of an industrial automation and control system in accordance with aspects of the present technique.

It is now recognized that it is desirable to provide a programmable controller or automation controller that does not include an integral display but that is capable of coupling with a separate display and memory module. Specifically, it is now recognized that it is desirable to provide a detachable display module that can be toollessly coupled with an automation controller. In accordance with present embodiments, the detachable display and memory module includes a display (e.g., a liquid crystal display) with an integral, non-transitory, machine-readable medium (e.g., a memory) capable of storing logic and/or software upgrades. Further, the display and memory module includes coupling features that facilitate toolless and communicative attachment to corresponding programmable controllers of various types (e.g., various different programmable controller models). Accordingly, the same display and memory module may be utilized to program and/or update numerous programmable controllers without requiring that each programmable controller include its own display.

It is now recognized that providing an attachable and detachable display and memory module eliminates certain inefficiencies in the field and in production of related programmable controllers. For example, expenses associated with including a display on one or more programmable controllers within a system are saved. Additionally, a technician can readily program a controller using the display and/or memory of the display and memory module without having to access the programmable controller using a separate computer. Further, because the display and memory module can be coupled to various different types of controllers (e.g., different programmable controller models), a manufacturer can be more efficient. Specifically, for example, consider a manufacturer that provides two different models of programmable controllers. Traditionally, each model would include a version with a display and a version without a display. Accordingly, the manufacturer would provide four different types of controllers (i.e., each of the two programmable controller models with and without a display). In accordance with present embodiments, the two different models of programmable controllers may be manufactured to utilize the same display and memory module. Accordingly, rather than provide four different types of programmable controllers, the manufacturer can provide two kinds of programmable controllers (i.e., a single version of each programmable controller model without a display), wherein each model is capable of coupling with a separately provided display and memory module. Thus, a customer can simply order a desired number of programmable controller models without an integral display and share a single display and memory module among them. This can be more cost efficient for the customer.

References in the specification to "one embodiment", "an embodiment", "an exemplary embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Turning now to the drawings and referring first to FIG. 1, a schematic of an industrial automation and control system 10 in accordance with present embodiments is illustrated. The system 10 includes an enclosure 12, such as an electrical cabinet, in which electrical components such as monitoring and/or control components are housed. Example components in the unit may include relays, motor starters, and programmable logic controllers (PLC), among others. The enclosure 12 may be suitable, for example, for assembly of a motor control center or use with industrial, commercial, marine, or other electrical systems. The enclosure 12 may be made of any suitable material, such as heavy gage sheet metal, reinforced plastics, and so forth. In certain embodiments, the enclosure 12 includes individual compartments or other structures that support the electrical components.

In the illustrated embodiment, the system 10 includes an industrial automation device capable of performing industrial automation tasks. Specifically, in the illustrated embodiment, the industrial automation device is an automation controller or programmable controller 14 including a detachable display and memory module 16 in accordance with present techniques. The programmable controller 14 is configured to monitor and/or control a machine or system, as represented by process 18. Specifically, the programmable controller 14 includes an integral processor and memory configured to provide a process control function based on data received from the process via an input/output feature. The programmable controller 14 may control the process 18 via an interface with components of the process 18. It should be noted that such an interface in accordance with embodiments of the present techniques may be facilitated by the use of certain network strategies. Indeed, an industry standard network may be employed, such as DeviceNet, to enable data transfer. Such networks permit the exchange of data in accordance with a predefined protocol, and may provide power for operation of networked elements.

The process 18 may take many forms and include devices for accomplishing many different and varied purposes. For example, the process 18 may comprise a compressor station, an oil refinery, a batch operation for making food items, a mechanized assembly line, and so forth. Accordingly, the process 18 may comprise a variety of operational components generally represented by reference numeral 20, such as electric motors, valves, actuators, temperature elements, pressure components, or a myriad of manufacturing, processing, material handling and other applications. Further, the process 18 may comprise control and monitoring equipment for regulating process variables through automation and/or observation. For example, the illustrated process 18 includes automation devices such as sensors 22 and actuators 24. The sensors 22 may comprise any number of devices adapted to provide information regarding process conditions, such as pressure and temperature sensors or discrete indicators. The actuators 24 may include any number of devices adapted to perform a mechanical action in response to an input signal, such as automated valves. Some actuators 24 may also provide input to the programmable controller 14, such as an actuator status.

As illustrated, these sensors 22 and actuators 24 are in communication with the programmable controller 14 (e.g., a programmable logic controller (PLC) or monitoring station). In one embodiment, the sensors 22 and actuators 24 may communicate with the programmable controller 14 via one or more I/O modules 26 integral with or coupled to the programmable controller 14. The I/O modules 26 (e.g., I/O terminals and related components) may be features of an I/O board and may transfer input and output signals between the programmable controller 14 and the process 18. In some embodiments, the I/O modules 26 are integral with the programmable controller 14 and facilitate communication of external devices with a central processing unit of the programmable controller 14. Further, in certain embodiments, these devices (sensors 22 and actuators 24) may be utilized along with the programmable controller 14 to operate process equipment. Indeed, they may be utilized within process loops that are monitored and controlled by aspects of the process 18. Such a process loop may be activated based on process inputs (e.g., input from a sensor 22) or direct operator input received through the display and memory module 16.

The I/O modules 26 may be integrated with the programmable controller 14, or may be added or removed via expansion slots, bays or other suitable mechanism. For example, to add functionality to the programmable controller 14, additional I/O modules 26 may be added, such as if new sensors 22 or actuators 24 are added to control the machine, system, or process 16. These I/O modules 26 serve as an electrical interface to the programmable controller 14 and may be located proximate or remote from the programmable controller 14 including in remote network interfaces to associated systems. The I/O modules 26 may include input modules that receive signals from input devices such as photo-sensors and proximity switches, output modules that use output signals to energize relays or to start motors, and bidirectional I/O modules, such as motion control modules which can direct motion devices and receive position or speed feedback. In some embodiments, the I/O modules 26 may convert an analog signal from a controlled machine to a digital signal that can be used by the programmable controller 14. Additionally, some of the I/O modules 26 may provide digital signals to digital I/O devices and receive digital signals from digital I/O devices. Further, in some embodiments, the I/O modules 26 that are used to control motion devices or process control devices may include local microcomputing capability on the I/O module. In some embodiments, data is communicated with remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, and so forth), ControlNet, DeviceNet, or other network protocols (Foundation Fieldbus (H1 and Fast Ethernet) Modbus TCP, Profibus) and also communicate to higher level computing systems The display and memory module 16 may be referred to as a detachable display module 16 because it is configured to be readily attached and detached from the programmable controller without tools (i.e., toollessly). Indeed, the detachable display module 16 may include integral coupling features that can be employed without tools. The detachable display module 16 includes a display and a memory. In the illustrated embodiment, the detachable display module 16 includes a liquid crystal display (LCD) 30 and a rewritable memory chip 32. The display 30 may be configured to coordinate with the programmable controller 14 to display output parameters such as operating parameters of the process/system 18, temperature and pressures sensed by the sensors 22, position information of the actuators 24, alarm information, and so forth. Additionally, the display 30 enables a technician to receive feedback from the programmable controller 14 during programming. The display 30 may also include a touch screen or the detachable display module 16 may include a separate data entry feature 34 that is capable of receiving input from an operator. By activating certain areas of the display 30 via touch or otherwise activating the data entry feature 34 (e.g., a button pad), the detachable display module 16 may communicate information to the programmable controller 14. Indeed, a technician may program the programmable controller 14 in the field using the detachable display module 16. Further, the memory 32 of the detachable display module 16 may store logic, software upgrades, or other types of code to facilitate management or control of the programmable controller 14.

Figure 2:
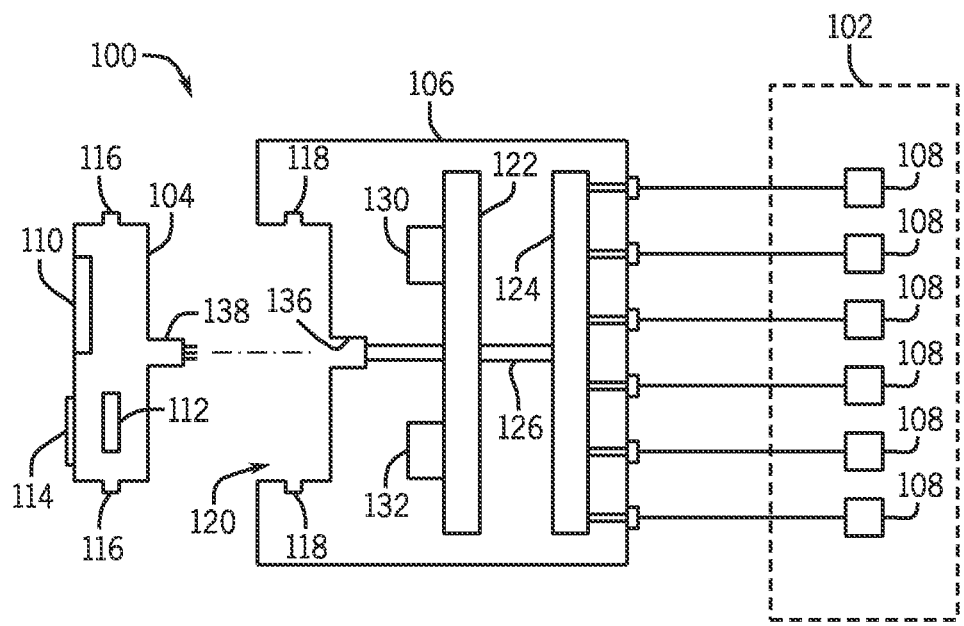
FIG. 2 is a schematic of an industrial automation device integrated with a process in accordance with aspects of the present technique.

FIG. 2 is a schematic view of an industrial automation device 100 integrated with a process 102 in accordance with present embodiments. Specifically, FIG. 2 illustrates a detachable display module 104, a programmable controller 106, and automation devices 108 of the process 102. The detachable display module 104, which includes a display 110, a memory 112, and a data entry pad 114, is detached from the programmable controller 106 in the illustrated embodiment. However, as schematically illustrated in FIG. 2, the detachable display module 104 includes coupling features 116 that correspond to coupling features 118 of the programmable controller 106 and enable attachment of the detachable display module 104 with the programmable controller 106. Indeed, upon insertion of the detachable display module 104 into a receptacle 120 of the programmable controller 106, the coupling features 116, 118 may engage with one another to retain the detachable display module 104 in place relative to the programmable controller 106. Such engagement between the coupling features 116, 118 is achieved without tools in accordance with present embodiments.

Various different types of coupling features 116, 118 may be utilized in accordance with present embodiments. For example, the coupling features 116, 118 may include a snap feature that flexes during insertion of the detachable display module 104 into the receptacle 120 and then flexes back such that an extension of one of the coupling features 116, 118 engages an opening in the corresponding coupling feature 116, 118. Thus, toolless assembly of the detachable display module 104 and the programmable controller 106 may be achieved. Similarly, the detachable display module 104 may be detached from the programmable controller 106 toollessly. Further, any of various different types of retention features may be utilized instead of the receptacle 120. For example, instead of the receptacle 120, a protrusion from the programmable controller 106 may be configured to couple with a receptacle of the detachable display module 104 and so forth.

The programmable controller 106 includes a central processing unit 122 and a input/output board 124 that are coupled together via a communicative coupling 126 (e.g., wiring and/or connectors). The central processing unit 122 includes a memory 130 and a processor 132 and it is communicatively coupled to a connector 136 configured to communicatively couple with a connector 138 of the detachable display module 104. The connectors 136, 138 transmit information between the programmable controller 106 and the detachable display module 104. For example, the connectors 136, 138 may cooperate to provide the display 110 with visual data from the central processing unit 122 that has changed based on data entered via the data entry pad 114 and transmitted to the central processing unit 112 via the connectors 136, 138. The connectors 136, 138 may also transmit data from the memory 112 of the detachable display module 104 to the programmable controller 106, such as software updates, programming changes, and so forth. Indeed, the memory 112 may be configured to receive data from an external computer and then transmit such data to various different programmable controllers when the detachable display module 104 is engaged with each of the various programmable controllers. Similarly, the programmable controller 106 can be programmed in the field by taking input from a technician into the detachable display module 104 and transmitting it to the programmable controller 106 via the connectors 136, 138. It should be noted that different types of the connectors 136, 138 may be employed in accordance with present embodiments. Further, multiple connectors may be employed such that different connectors communicate different types of information. For example, a first connector may be dedicated to the display 110 and a second connector may be dedicated to the data entry pad 114. Such separate and dedicated connectors may be considered components of a single connector in accordance with present embodiments.

The input/output board 124 communicates with the automation devices 108 (e.g., sensors and actuators) of the process 102. For example, the input/output board 124 may provide instructions to certain actuators or engines of the process and receive data from certain sensors of the process 102. Input received by the input/output board 124 from the process is transmitted to the central processing unit 122 for analysis. Based on logic or programming stored in the memory 130, the central processing unit may provide instructions to one or more of the automation devices 108 via the input/output board 124. In the illustrated embodiment, the input/output board 124 is integral with the programmable controller 106. However, in some embodiments, the input/output board 124 may be separate from the programmable controller 106.

Figure 3:
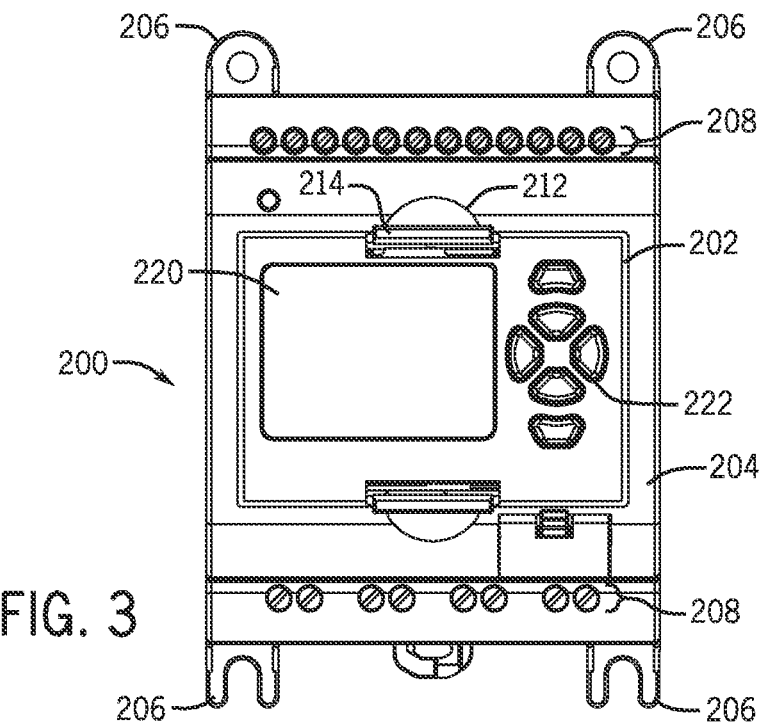
FIG. 3 is a front view of a programmable controller with an attached display module in accordance with aspects of the present technique.

FIG. 3 is a front view of a programmable controller 200 with an attached display module 202 in accordance with present embodiments. The programmable controller 200 illustrated in FIG. 3 represents one embodiment of the programmable controller 106 illustrated in FIG. 2, and the display module 202 illustrated in FIG. 3 represents one embodiment of the detachable display module 104 illustrated in FIG. 2. In the illustrated embodiment, the programmable controller 200 includes a body 204 with attachment features 206 extending therefrom. The attachment features 206 are configured to facilitate coupling the programmable controller 200 with a support (e.g., a wall or control cabinet). Further, the programmable controller includes input/output terminals 208 within the body 204 that are capable of being coupled to automation devices (e.g., automation devices 108) to facilitate communication between the programmable controller 106 and the automation devices. Indeed, the input/output terminals 208 may be integral with an input/output board such as the input/output board 124 of FIG. 2. Further, the programmable controller 200 includes a receptacle in which the display module 202 in disposed, and coupling features 212 that are engaged with coupling features 214 of the display module 202, as will be discussed in further detail below.

The display module 202 includes the coupling features 214, a display 220, and a data entry pad 222. The display 220, a memory (not shown), and the data entry pad 222, which are disposed within a body of the display module 202, may communicate with the programmable controller 200 when the display module 202 is communicatively coupled with the programmable controller 200, as discussed above with regard to the programmable controller 106 and the detachable display module 104. The data entry pad 222 enables a user to navigate and select options provided on the display 220. The coupling features 214 of the display module 202, which extend from the body, cooperate with the coupling features 212 of the programmable controller 200 to enable toolless coupling and decoupling of the display module 202 with respect to the controller 200.

Figure 4:
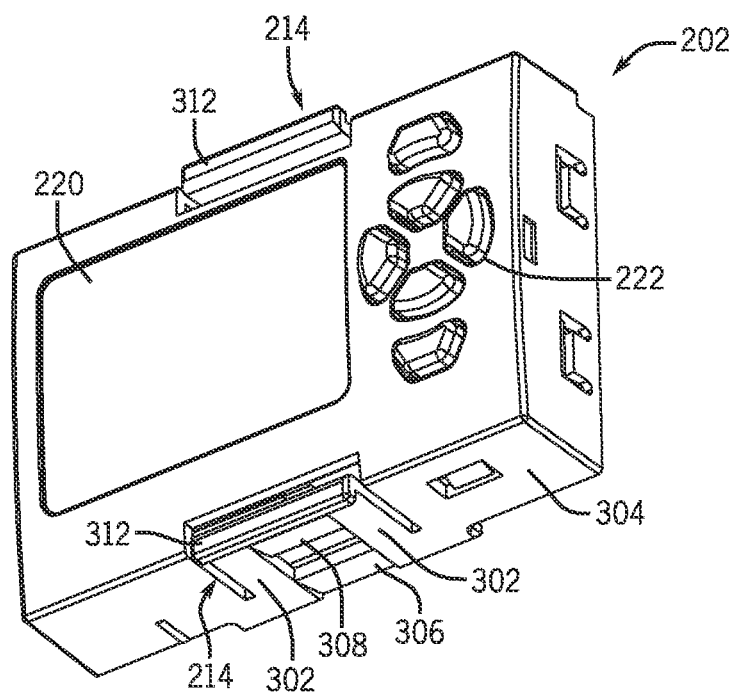
FIG. 4 is a perspective view of a display module detached from a programmable controller in accordance with aspects of the present technique.
Figure 5:
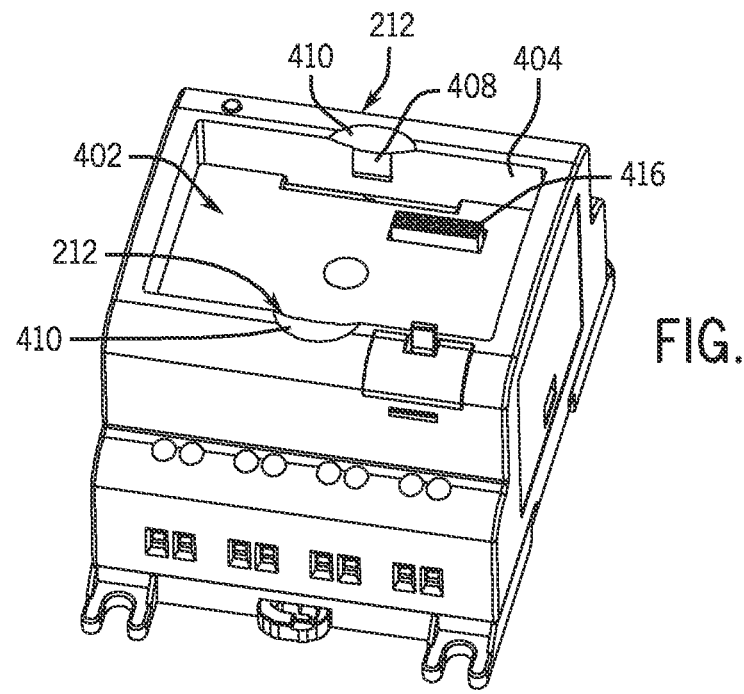
FIG. 5 is a perspective view of a programmable controller without a display module attached in accordance with aspects of the present technique.
Figure 6:
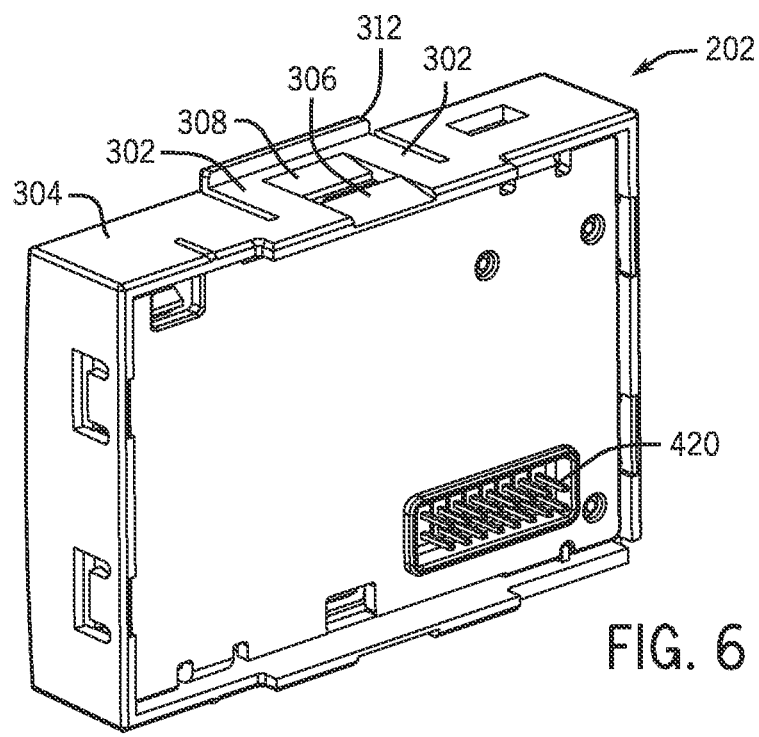
FIG. 6 is a perspective view of the back of the detached display module illustrated in FIG. 4 in accordance with aspects of the present technique.

As better illustrated in FIGS. 4 and 5, the coupling features 212, 214 include features that slidably snap together. FIG. 4 includes a perspective view of the display module 202 detached from the programmable controller 200, and FIG. 5 includes a perspective view of the programmable controller 200 without the display module 202 attached. Specifically, the coupling features 214 of the display module 202 include elongate extensions 302 from a body 304 of the display module 202 with a first angled crosspiece 306 and a second angled crosspiece 308 extending between the elongate extensions 302. The coupling features 214 also include a tab 312 cantilevered from a distal end of each coupling feature 214 that facilitates gripping the coupling features 214 by a user. The programmable controller 200 includes a receptacle 402 with the coupling features 212 integrated with walls 404 of the receptacle 402. Specifically, the coupling features 212 include angled protrusions 408 from the walls 404 and indentations 410 around a lip of the receptacle 402 proximate a top of the coupling features 212. The receptacle 402 also include a connector 416 configured to communicatively couple with a connector 420 of the display module 202, as illustrated in FIG. 6, which is a perspective view of the back of the display module 202. In the illustrated embodiments of FIGS. 5 and 6, the connector 416 includes a female pin connector and the connector 420 includes a male pin connector. However, in other embodiments, different types of electronic connectors may be employed to facilitate communication between the programmable controller 200 and the display module 202.

As indicated above, the coupling features 212, 214 enable toolless assembly and disassembly of the display module 202 and the programmable controller 200. Thus, a technician can readily transfer the display module 202 to a different programmable controller as desired without the use of tools. While various different types of coupling features 212, 214 may be utilized in accordance with present embodiments, the illustrated embodiment includes coupling features 212, 214 that slidably engage and flex into a coupled orientation. Specifically, during insertion of the display module 202 into the receptacle 402 of the programmable controller 200, a bottom portion of the first angled crosspiece 306 engages a top portion of the angled protrusion 408. As the display module 202 progresses into the receptacle 402, the angles and positioning of the first angled crosspiece 306 and the angled protrusion 408 cause the elongate extensions 302 to flex inward toward the display module 202 and away from the wall 404, which enables the first angled crosspiece 306 to pass completely over the angled protrusion 408. Once the first angled crosspiece 306 is passed the angled protrusion 408, the elongate extensions 302 flex back toward the wall 404 causing an upper edge of the first angled crosspiece 306 to engage or interlock with a bottom edge of the angled protrusion 408. This engagement serves to hold the display module 202 in place within the receptacle 402. Further, the second angled crosspiece 308 is angled to receive an upper portion of the angled protrusion 408. It should be noted that during the process of sliding the display module 202 into the receptacle, the connectors 416, 420 become communicatively coupled such that data can be transmitted between the display module 202 and the programmable controller 200. For example, a software upgrade may be transmitted from the display module 202 to the programmable controller 200 without requiring a local computer or a separate memory component. In other embodiments, different coupling features may be employed. For example, the programmable controller 200 may include coupling features that flex to facilitate coupling.

The display module 202 can also be toollessly extracted from the receptacle 402. In order to initiate extraction of the display module 202 from the programmable controller 200, the coupling features 214 of the display module 202 are flexed toward each other. For example, a user may grip the tabs 312 and push them together with one or two hands such that the elongate extensions 302 flex inward toward the display module 202. This flexing causes the first angled crosspiece 306 to become disengaged with the angled protrusion 408. While the elongate extensions 302 are flexed inwardly, the display module can be slidably disengaged from the receptacle 402. During extraction, the angled crosspiece 306 slides over a face of the angled protrusion 408 and the connectors 416, 420 become uncoupled, which severs communication between the programmable controller 200 and the display module 202. It should be noted that once the upper edge of the first angled crosspiece 306 is passed the bottom edge of the angled protrusion 408, the coupling features 214 can be allowed to flex outwardly away from the display module 202, which will cause the first angled crosspiece 306 to press against the angled protrusion 408 such that extraction of the display module 202 may be facilitated.

Figure 7:
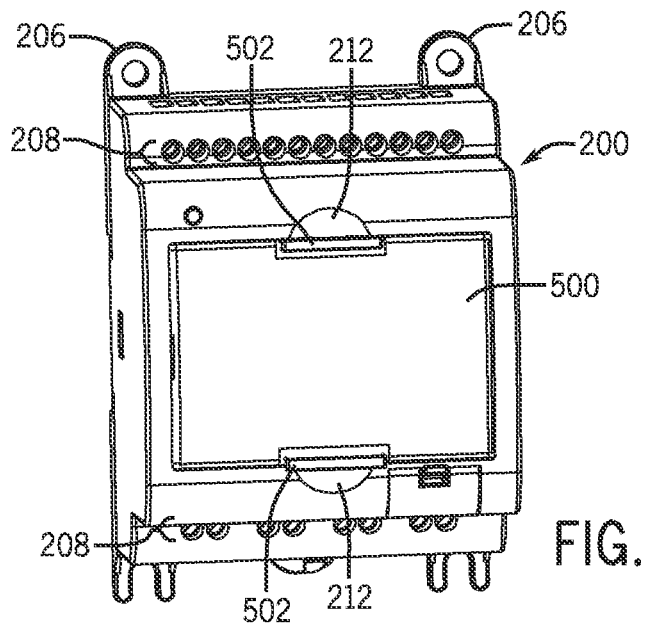
FIG. 7 is a perspective view of a blank cover or protective cover coupled with a retention feature of a programmable controller to provide components of the programmable controller with protection from the environment in accordance with aspects of the present technique.

As indicated above, the display module 202 may be utilized with various different programmable controllers, such as the programmable controller 200. The display module 202 may be removed from one programmable controller and attached to another programmable controller. This enables costs savings by enabling the use of numerous programmable controllers that do not include the expense associated with an integral display. However, when the display module 202 is not coupled to the controller 200, the receptacle 402 is generally exposed and it may be undesirable to simply leave the receptacle 402 open to the environment. For example, it may not be desirable to allow dust and so forth to accumulate on the connector 416 or on inner components of the programmable controller 200 exposed through openings in the receptacle 402. Accordingly, in some embodiments, when the display module 202 is not being utilized on the programmable controller 200, a protective cover or blank cover 500 may be utilized, as illustrated in FIG. 7. The blank cover 500 has coupling features 502 that are essentially identical to the coupling features 214 of the display module 202. Accordingly, the blank cover 500 can toollessly couple with the programmable controller 200 and toollessly decouple from the programmable controller 200 like the display module 202. When the blank cover 500 and the programmable controller 200 are coupled together, as illustrated in FIG. 7, the blank cover 500 provides a protective barrier between features of the programmable controller 200 and the surrounding environment.

Figure 8:
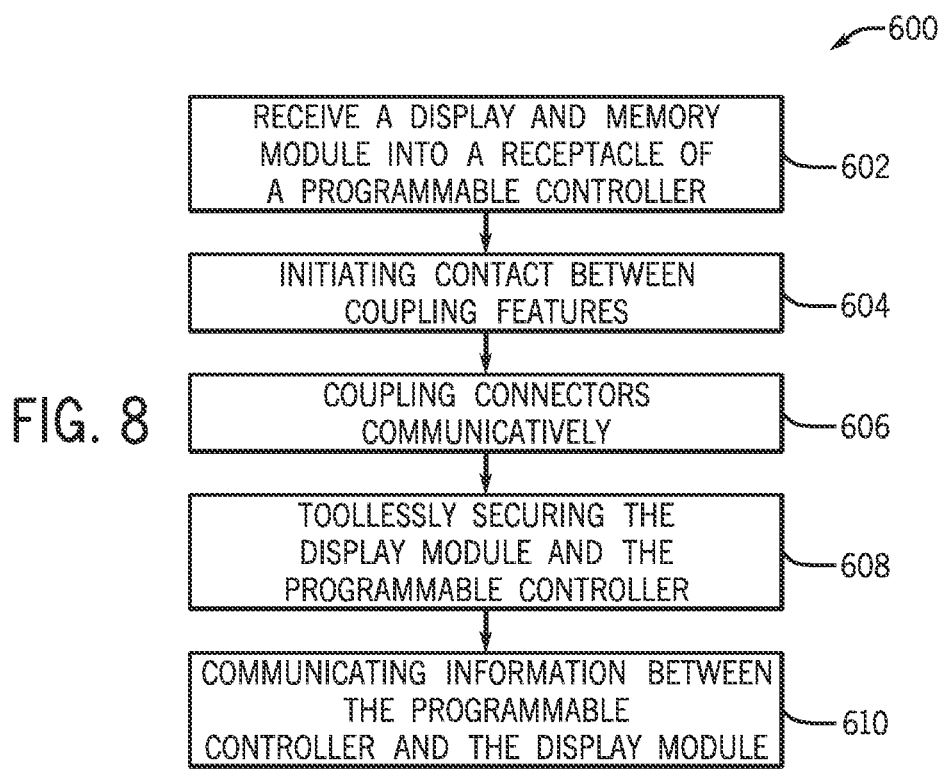
FIG. 8 is a block diagram of a process in accordance with aspects of the present technique.

FIG. 8 is a block diagram of a process 600 in accordance with present embodiments. The process 600 is directed to attaching a display module with a programmable controller in accordance with present embodiments such that a memory of the display module is communicatively coupled with the programmable controller. The process 600 is described from the perspective of the programmable controller and the display module. Specifically, the process 600 begins in block 602 with receiving a display and memory module into a programmable controller. For example, block 602 may include receiving a leading edge of a display module into a receptacle of a programmable controller. Block 604 represents initiating contact between coupling features of the display module and the programmable controller. For example, block 604 may include pressing coupling features of the display module and the programmable controller together as the display module slides into the receptacle such that one of the coupling features flexes to facilitate passage over the corresponding coupling feature. Block 606 represents coupling a connector of the display module with a connector of the programmable controller to facilitate communication between the display module and the programmable controller. For example, block 606 may include engaging a connector of the display module with a connector of the programmable controller as the display module is slid towards the programmable controller such that a communicative coupling is achieved when the display module and programmable controller are attached. Block 608 represents toollessly securing the display module and the programmable controller via the coupling features. Specifically, after the coupling features have passed over one another during the sliding engagement of the programmable controller and the display module, block 608 may represent flexing the coupling feature that was previously displaced back such that edges of the coupling features abut one another in the direction of sliding engagement and such that the programmable controller and the display module are substantially held in place relative to one another. This interaction between the coupling features maintains engagement of the connectors such that the display module can communicate with the programmable controller and prevents the display module from falling out of the programmable controller. Block 610 represents communicating information between the display module and the programmable controller. For example, block 610 may include the memory of the programmable controller transmitting data (e.g., a software upgrade or supplemental logic) to the programmable controller or information being received from a data entry feature of the display module into the programmable controller.

As will be appreciated by those skilled in the art, the above described implementations may be appropriately scaled and/or reinforced based upon the size of the automation controllers. The techniques described above provide a technique for providing a single detachable display module for multiple programmable controllers, thus providing substantial cost savings achieved by reduced number of parts required for each programmable controller while providing similar functionality.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. An automation controller system, comprising:
an integral memory module configured to store process control functions for control of automation devices of a process controlled by the automation controller, wherein the process utilizes a plurality of operational components for regulating process variables through automated process control;
a central processing unit configured to monitor, via an input/output module, data from the automation devices of the process controlled by the automation controller;
a detachable display and memory module;
a retention feature configured to toollessly couple with the detachable display and memory module; and
a controller connector configured to communicatively couple with a display connector of the detachable display and memory module such that the automation controller and the detachable display and memory module are communicatively coupled,
wherein the central processing unit is configured to transmit data for presentation on a display of the detachable display and memory module and configured to receive data from a memory and/or a data entry feature of the detachable display and memory module when the detachable display and memory module is communicatively coupled to the automation controller;
wherein the memory of the detachable display and memory module is configured to store at least one process control function and the central processing unit is configured to incorporate the at least one process control function into the process control functions stored in the integral memory module;
wherein the central processing unit is configured to control, via the input/output module, the automation devices based on the process control functions stored in the integral memory module, wherein the process control functions are provided to the central processing unit in response to the data monitored by the central processing unit; and
wherein processing functions of the display and memory module are directly provided by the central processing unit of the automation controller.

2. The automation controller system of claim 1, comprising the input/output module.

3. The automation controller system of claim 2, wherein the input/output module comprises an input/output board that is integral with the central processing unit.

4. The automation controller system of claim 1, wherein the retention feature comprises a receptacle configured to receive coupling features of the detachable display and memory module.

5. The automation controller system of claim 1, wherein the retention feature comprises a protrusion configured to couple with a receptacle of the detachable display and memory module.

6. The automation controller system of claim 1, wherein the retention feature comprises a receptacle with angled protrusions extending from each of at least two walls of the receptacle.

7. The automation controller system of claim 6, wherein each of the angled protrusions is configured to slidably engage with a respective flexible coupling feature of the detachable display and memory module such that the flexible coupling features flex to pass over the respective angled protrusions and then flex back to engage an edge of each angled protrusion to resist movement of the detachable display and memory module away from engagement with the automation controller.

8. The automation controller system of claim 1, wherein the controller connector comprises a female pin connector or a male pin connector.

9. The automation controller system of claim 1, wherein the controller connector comprises various connection components.

10. The automation controller system of claim 1, wherein the controller connector comprises a first connection component configured to transmit data between a display and the automation controller, a second connection component configured to transmit data between a data entry feature and the automation controller, and a third connection component configured to transmit data between an external memory and the automation controller.

11. An automation controller system, comprising:
a detachable display and memory module, comprising a first connector and coupling features;
a module housing of the detachable display and memory module;
a display disposed within the module housing;
a memory disposed within the module housing;
an automation controller;
an integral memory module of the automation controller, wherein the integral memory module is configured to store process control functions for control of automation devices of a process controlled by the automation controller, wherein the process utilizes a plurality of operational components for regulating process variables through automated process control;
a central processing unit of the automation controller, wherein the central processing unit is configured to monitor, via an input/output module, data from the automation devices of the process controlled by the automation controller;
a retention feature of the automation controller, wherein the retention feature is configured to toollessly couple with the coupling features of the detachable display and memory module; and
a second connector of the automation controller, wherein the second connector is configured to communicatively couple with the first connector of the detachable display and memory module such that the automation controller and the detachable display and memory module are communicatively coupled,
wherein the central processing unit is configured to transmit data for presentation on the display of the detachable display and memory module and configured to receive data from the memory of the detachable display and memory module when the detachable display and memory module is communicatively coupled to the automation controller,
wherein the memory of the detachable display and memory module is configured to store at least one process control function, and the central processing unit is configured to incorporate the at least one process control function into the process control functions stored in the integral memory module,
wherein the central processing unit is configured to control, via the input/output module, the automation devices based on the process control functions stored in the integral memory module, wherein the process control functions are provided to the central processing unit in response to the data monitored by the central processing unit, and
wherein processing functions of the display and memory module are directly provided by the central processing unit of the automation controller.

12. The system of claim 11, wherein the detachable display and memory module comprises a data entry feature.

13. The system of claim 12, wherein the data entry feature comprises a touch screen component of the display or a data entry pad.

14. The system of claim 11, wherein the memory module is configured to receive data from an external computer.

15. The system of claim 11, wherein the retention feature comprises a receptacle or a protrusion.

16. A detachable display and memory module system, comprising:
- a module housing;
- a display disposed within the module housing;
- a memory disposed within the module housing and configured to store at least one process control function and exclusively utilize a central processing unit of an automation controller to provide the at least one process control function to an integral memory of the automation controller, wherein the integral memory is configured to store process control functions for control of automation devices of a process controlled by the automation controller, wherein the process utilizes a plurality of operational components for regulating process variables through automated process control;
- a display connector configured to communicatively couple with a controller connector of the automation controller upon attachment of the detachable display and memory module with the automation controller; and
- coupling features configured to toollessly couple with aspects of a retention feature of the automation controller;
- wherein the central processing unit is configured to incorporate the at least one process control function into the process control functions stored in the integral memory and to control the automation devices based on the process control functions stored in the integral memory, the process control functions provided to the central processing unit in response to data monitored by the central processing unit.

17. The detachable display and memory module system of claim 16, comprising a data entry feature.

18. The detachable display and memory module system of claim 17, wherein the data entry feature comprises a touch screen.

19. The detachable display and memory module system of claim 16, wherein the memory is configured to communicate with the automation controller via a dedicated component of the display connector.

20. The detachable display and memory module system of claim 16, wherein the coupling features comprise elongated flexible extensions from the housing configured to bend upon engagement with the aspects of the retention feature and flex back to abut edges of the aspects of the retention feature to hold the detachable display in place relative to the automation controller.

* * * * *